United States Patent
Sarmili et al.

(10) Patent No.: US 9,850,129 B2
(45) Date of Patent: Dec. 26, 2017

(54) RECOVERY OF BROMIDE FROM SULFATE COMPRISING AQUEOUS STREAMS

(71) Applicant: BROMINE COMPOUNDS LTD., Beer Sheva (IL)

(72) Inventors: Sarit Sarmili, Karmiel (IL); Gideon Friedman, Haifa (IL); Eyal Barnea, Nesher (IL); David Fuks, Haifa (IL); Mira Bergstein Freiberg, Omer (IL)

(73) Assignee: Bromine Compounds Ltd., Beer Sheva (IL)

( * ) Notice: Subject to any disclaimer, the term of this patent is extended or adjusted under 35 U.S.C. 154(b) by 0 days.

(21) Appl. No.: 14/762,682

(22) PCT Filed: Jan. 27, 2014

(86) PCT No.: PCT/IL2014/000008
§ 371 (c)(1),
(2) Date: Jul. 22, 2015

(87) PCT Pub. No.: WO2014/115134
PCT Pub. Date: Jul. 31, 2014

(65) Prior Publication Data
US 2015/0329370 A1    Nov. 19, 2015

Related U.S. Application Data

(60) Provisional application No. 61/757,167, filed on Jan. 27, 2013.

(51) Int. Cl.
*C01F 11/34* (2006.01)
*C01B 21/48* (2006.01)
(Continued)

(52) U.S. Cl.
CPC ............ *C01B 9/04* (2013.01); *B01D 11/0446* (2013.01); *B01D 11/0492* (2013.01); *C01B 21/48* (2013.01); *C01F 11/34* (2013.01)

(58) Field of Classification Search
CPC .................... C01F 11/34; C01B 9/04
(Continued)

(56) References Cited

U.S. PATENT DOCUMENTS 3,449,088 A * 6/1969 Lee ................. C01D 15/04
423/157
3,490,880 A * 1/1970 Charlesworth ........... C01F 5/30
23/300

(Continued)

FOREIGN PATENT DOCUMENTS

EP    1414748    10/2011

OTHER PUBLICATIONS

Egozy et al., "Resins Containing Extractants: Preparation and Applications"; Elsevier Science Publishers B.V., Amsterdam; (1983) pp. 109-117.

(Continued)

*Primary Examiner* — Ngoc-Yen Nguyen
(74) *Attorney, Agent, or Firm* — Sorell Lenna & Schmidt, LLP

(57) ABSTRACT

A solvent extraction process for recovering bromide from a sulfate-containing aqueous stream, the process comprises an extraction step wherein said aqueous stream is mixed with an extraction medium comprising a tertiary amine extractant dissolved in one or more water-immiscible organic solvents, wherein said mixing is carried out in a strongly acidic environment, thereby forming bromide-containing extract and a raffinate with a reduced bromide level, wherein the bromide-containing extract is optionally treated to further minimize the presence of sulfate and is subsequently combined with an aqueous calcium source to form calcium bromide.

15 Claims, 1 Drawing Sheet

(51) Int. Cl.
*C01B 9/04* (2006.01)
*B01D 11/04* (2006.01)

(58) Field of Classification Search
USPC .......................................................... 423/497
See application file for complete search history.

(56) References Cited

U.S. PATENT DOCUMENTS

| | | | |
|---|---|---|---|
| 3,649,219 A | 5/1972 | Lynn et al. | |
| 7,037,482 B2 | 5/2006 | Mason | |
| 2004/0131535 A1* | 7/2004 | Grinbaum | C01F 5/30 423/497 |

OTHER PUBLICATIONS

Hanson et al., "Extraction of Magnesium Chloride from Brines Using Mixed Ionic Extractants"; Journal of Inorganic & Nuclear Chemistry, vol. 37; (1975) pp. 191-198.

* cited by examiner

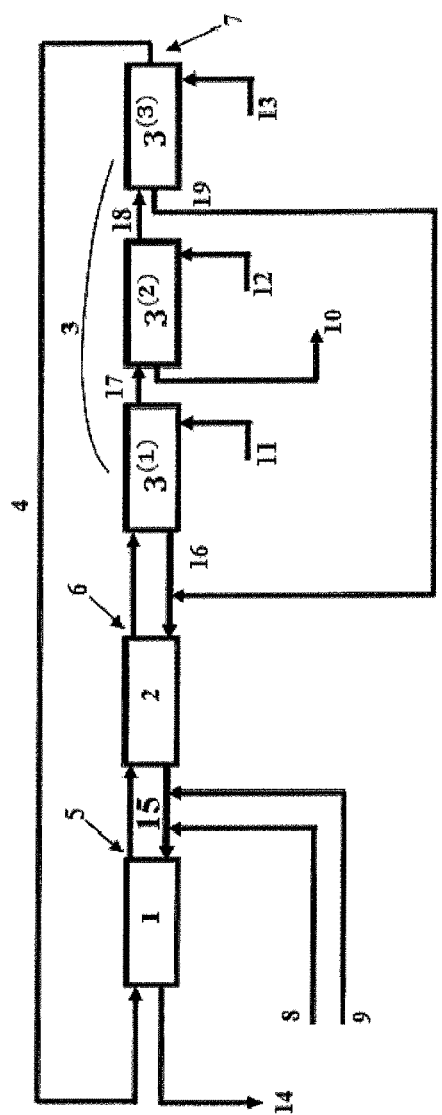

RECOVERY OF BROMIDE FROM SULFATE COMPRISING AQUEOUS STREAMS

The invention relates to the recovery of bromide (Br—) from aqueous streams (e.g., aqueous waste streams produced in industrial plants) by means of liquid-liquid extraction method. Hereinafter, the terms liquid-liquid extraction and solvent extraction are used interchangeably.

A bromide-containing aqueous stream may be produced, for example, in electric power generating plants which are driven by the combustion of fossil fuels and employ the wet flue gas desulfurization (WFGD) process and bromide-containing additives for the removal of sulfur dioxide and mercury, respectively, from the flue gases prior to the release of the flue gases to the atmosphere.

The separation of bromide from various aqueous solutions by the use of amine extractant has been reported. Egozy, Belfer and Korngold [Reactive Polymers 1, p. 109-117 (1983)] reported that bromide can be separated from highly concentrated brines by means of porous polymers into which Alamine 336—a tertiary amine—was incorporated. Liquid-liquid extraction of bromide from Dead Sea brine is described in EP 1414748, for the purpose of calcium bromide production. To this end, anion and cation exchangers (a weak amine base, e.g., Alamine 336 and a weak carboxylic acid, e.g., isodecanoic acid) were simultaneously employed. A solvent extraction method for simultaneously extracting halide (chloride or fluoride) and sulfate from an aqueous solution is described in U.S. Pat. No. 7,037,482. Among the extractants tested were secondary, tertiary and quaternary amines. Alamine 336 was recommended for use if higher sulfuric acid extraction efficiencies are required, along with halide extraction.

The purpose of the present invention is to provide a solvent extraction method for separating bromide from an aqueous stream and recovering same, for example, in the form of calcium bromide. The presence of sulfate ions in the feed aqueous stream to be treated poses a challenge to bromide recovery via calcium bromide production, because treating a sulfate-containing extract with an aqueous calcium source would lead to the precipitation of calcium sulfate, which is only sparingly soluble in water.

Experimental work conducted in support of the invention indicates that a tertiary amine base, such as Alamine 336, has higher selectivity for sulfate against chloride. Furthermore, neither the distribution coefficient of sulfate nor the distribution coefficient of chloride is affected by temperature variation; these distribution coefficients remain essentially constant over the range of temperature from 10 to 50° C. However, quite surprisingly, the experimental results reported below show that Alamine 336 is highly selective towards bromide as against sulfate. Furthermore, the distribution coefficient of bromide is temperature-dependent, such that the working temperature may be favorably chosen to achieve enhanced extraction efficiency of bromide in the presence of sulfate.

Thus, a solution of a tertiary amine base, such as Alamine 336, in a suitable water-immiscible organic solvent, or in a mixture of such solvents, can serve as an extraction medium for recovering bromides from sulfate-containing aqueous streams, with only low levels of simultaneous sulfate extraction. Furthermore, it has been found that sulfate captured by the extract can be almost completely removed from the organic phase by gradually washing the extract, under careful pH adjustment, to obtain sulfate-free extract which is still fairly bromide-rich such that it can be processed to recover calcium bromide therefrom.

The extraction medium used in the process is a solution of one or more tertiary amine extractants in water-immiscible organic solvent(s), wherein said solvent is selected from the group consisting of a) aromatic solvents; b) mixtures of an aliphatic solvent with a polar solvent, e.g., with a long chain alcohol; c) an amide solvent and d) an ester of phosphoric acid. Preferably, the extraction medium is devoid of extractants other than tertiary amines. The extraction medium provided by the present invention exhibits high selectivity to bromides in a strongly acidic environment and is capable of removing bromide even from relatively dilute aqueous streams, e.g., streams with specific gravity of less than 1.2 $g/cm^3$. The organic extraction medium, in particular a solution of the tertiary amine extractant in a mixture consisting of an aliphatic solvent and a polar solvent (e.g., with a long chain alcohol) is easily separable from the aqueous phase and can be readily purified and recycled.

Accordingly, the invention relates to a solvent extraction process for recovering bromide from a sulfate-containing aqueous stream, the process comprises an extraction step wherein said aqueous stream is mixed with an extraction medium comprising a tertiary amine extractant dissolved in one or more water-immiscible organic solvents, wherein said mixing is carried out in a strongly acidic environment, thereby forming bromide-containing extract and a raffinate with a reduced bromide level, wherein the bromide-containing extract is optionally treated to further minimize the presence of sulfate and is subsequently combined with an aqueous calcium source to form calcium bromide.

More specifically, the invention is a solvent extraction process for recovering bromide from a sulfate-containing aqueous stream, comprising:
an extraction step, wherein said aqueous stream is mixed with an extraction medium comprising a tertiary amine extractant dissolved in one or more water-immiscible organic solvents, wherein said mixing is carried out in a strongly acidic environment (e.g., pH<3), thereby forming a bromide-containing extract and a raffinate with reduced bromide levels;
a purification step, wherein the bromide-containing extract is treated with an aqueous bromide solution to form a bromide-enriched extract; and
a washing step, wherein the bromide-enriched extract undergoes gradual neutralization and sulfate removal by combining same with a plurality of aqueous bases applied in succession, with phase separation taking place between each stage of basification to produce, after each stage, an aqueous bromide salt solution corresponding to the base employed and an organic medium with progressively increasing content of the tertiary amine in its free base form, wherein at least one of said successively applied aqueous bases—with the exception of the first—comprises the required cation of the salt product, such as calcium source.

The so-formed aqueous bromide salt solutions generated in the washing step are preferably directed to, and used in, the purification step, as a bromide source for converting the bromide-containing extract into a bromide-enriched extract.

On achieving complete neutralization at the end of the washing step, the tertiary amine is present in the organic medium essentially in its free base form, such that the organic medium can be circulated and reused as the extraction medium in the extraction step.

For example, the process can be carried out in a continuous mode of operation, using a plurality of mixer-settler batteries arranged in accordance with the three successive steps set out above and operating in a countercurrent fashion, as described in detail below.

The amine extractant used in the present invention is tertiary amine (i.e., $NR_1R_2R_3$, wherein $R_1$, $R_2$ and $R_3$ are the same or different and are long alkyl groups, which may be either linear or branched groups, such as C7-C12 alkyl groups). Especially preferred is a tertiary amine comprising a mixture of trioctyl amine [$N(C_8H_{18})_3$] and tridecyl amine [$(N(C_{10}H_{22})_3$] which is commercially available as Alamine 336.

The amine extractant is dissolved in a suitable water-immiscible organic solvent, or in a mixture of such solvents, to form the extraction medium operative in the process. It is especially preferred to dissolve the amine in a mixture of water-immiscible solvents comprising aliphatic hydrocarbon solvent(s) and an alcohol solvent. The aliphatic hydrocarbon solvent consists of long chains of carbon atoms and preferably has molecular weight of more than 100 g/mol, e.g., from 110 to 400 g/mol. To this end, petroleum distillates like kerosene can be used. A particularly preferred aliphatic hydrocarbon solvent is petroleum distillate consisting of a mixture of different chains with molecular weight from about 130 to 250 g/mol. A commercially available example is Parasol from Paz & Oils Chemicals Ltd Company, Israel. The alcohol used is either a straight or branched primary, secondary or tertiary alcohol containing not less than 6 carbon atoms, e.g., C6-C13 alcohols, such as 1-decanol. The experimental results reported below indicate that this particular combination of aliphatic hydrocarbon solvent and a long-chain alcohol allows the organic/aqueous mixtures generated in the solvent extraction process of the invention to be separated into one organic phase and one aqueous phase (i.e., there is no secondary separation of the amine salt from the organic phase, to form a second organic phase), with minimal amounts of water being present in the organic phase.

The concentration of the amine extractant in the extraction medium used in the invention (which medium consists of the amine and the organic solvent(s)) is not less than 0.3M, e.g., between 0.5 and 1M. When a solvent mixture consisting of aliphatic hydrocarbon(s) together with a long chain alcohol is used, then the concentration of the alcohol in the extraction medium is in the range from 0.2M to 0.5M. In a preferred embodiment of the invention, the extraction medium comprises an amine extractant, aliphatic hydrocarbon(s) and C6-C13 alcohol at weight ratios in the ranges 3-5:3-17:1, preferably about 3-5:5-7:1, for example 4:6:1.

It is also possible to provide an extraction medium suitable for use in the invention by the dissolution of the amine extractant in an aromatic solvent (e.g., benzene, toluene or xylene), an amide solvent of the formula $R_4$—C(O)$NR_5R_6$ wherein $R_4$, $R_5$ and $R_6$ are independently alkyl groups (e.g., N,N-dimethyldecanamide, which is commercially available as Hallocomide M-8-10) or an ester of phosphoric acid in which the alkyl groups are preferably branched alkyl groups containing not less than four carbon atoms (e.g., tri-isobutyl phosphate (i-butyl-O)$_3$P=O).

The solvent extraction of bromide from an aqueous stream by means of the extraction medium described above is carried out in an acidic environment (pH less than 3) formed due to the presence of a strong mineral acid such as hydrochloric acid. To this end, an acidic aqueous solution (e.g., HCl solution) at a concentration of preferably not less than 1%, e.g., around 15 to 25%, is supplied periodically or continuously to the reaction vessel in which the extraction medium and the bromide-containing aqueous stream are mixed together.

The extraction step may be carried out at a temperature below 25° C., e.g., below 20° C. (for example, from 10° C. to 20° C.). More specifically, the process of the invention comprises an extraction, purification and washing (stripping) steps allowing calcium bromide recovery and recycling of the extraction medium, wherein:

the extraction step comprises:

mixing the extraction medium with a bromide-containing aqueous stream in the presence of a strong mineral acid other than sulfuric acid, to form a mixture, separating the so-formed mixture into an organic phase and an aqueous phase, thus forming a bromide-containing extract and an aqueous raffinate, respectively;

the purification step comprises:

mixing said bromide-containing extract with an aqueous bromide solution, to form a mixture;

separating the so-formed mixture into an organic phase and an aqueous phase, wherein said organic phase consists of a bromide-enriched extract;

the washing (stripping) step comprises:

mixing said bromide-enriched extract with a base $M^1(OH)_p$ to form a first mixture;

separating said first mixture into a first organic phase, comprising an essentially sulfate-free bromide-containing extract (e.g, sulfate less than 0.3% and bromide more than 2.5% by weight) and a first aqueous phase, comprising a solution of a bromide salt $M^1(Br)_p$, wherein the pH of said aqueous $M^1(Br)_p$ solution is preferably from 4 to 6;

mixing said essentially sulfate-free, bromide-containing extract with a calcium source, to form a second mixture;

separating said second mixture into a second organic phase, consisting of a bromide-containing extract, and a second aqueous phase, comprising an aqueous solution of calcium bromide;

mixing said bromide-containing extract with a base $M^3(OH)_p$, to form a third mixture;

separating said third mixture into a third organic phase, consisting of a bromide-free extraction medium in which the tertiary amine is present in its free base form, and a third aqueous phase, comprising an aqueous solution of a bromide salt $M^3(Br)_p$, wherein the process further comprises directing the so-formed bromide solutions $M^1(Br)_p$ and $M^3(Br)_p$ to the purification step, and the bromide-free extraction medium to the extraction step.

$M^1$ most preferably indicates an alkali metal, e.g., sodium, such that p=1. The concentration of the $M^1(OH)_p$ solution employed in the first stage of the washing step is from 10 to 35 wt %. For example, 17 to 25 wt % aqueous NaOH solution is used. The calcium source employed in the second stage of the washing process preferably comprises calcium hydroxide, e.g., in the form of a suspension in aqueous calcium bromide (the latter in turn may be supplied by the process). $M^3$ most preferably indicates an alkali metal, e.g., also sodium. The concentration of the $M^3(OH)_p$ solution employed in the third stage of the washing step is from 1 to 10 wt %. For example, 3 to 7 wt % aqueous NaOH solution is used.

FIG. 1 provides a schematic illustration of a preferred embodiment of the process of the invention, which is performed in a continuous mode of operation. The process consists of an extraction step (1), a purification step (2) and a washing/stripping step (3) carried out in succession. As shown in FIG. 1, the organic and aqueous streams which are used and produced in the process flow in a countercurrent fashion. The organic stream (namely, the extraction medium in various forms as discussed below) flows in a closed loop (4) all over the process (fresh amounts of the extraction medium may be added periodically, if needed). The extraction medium outlet (5) of the extraction step (1) is connected to the purification step (2), while the extraction medium outlet (6) of the purification step (2) is in turn connected to the washing/stripping step (3), as indicated by arrows. The extraction medium outlet (7) of the washing/stripping step (3) is connected to the extraction step (1) via flow path (4), thus providing a loop allowing the recycling of the extraction medium to the extraction step (1). As to the aqueous streams, they are either injected into the process at various points [i.e., the bromide-containing feed (8), the aqueous acidic stream (9) and the feed alkaline streams (11), (12) and (13)], or withdrawn from the process (i.e., the depleted bromide-containing stream (14) and the bromide salt product stream (10)).

Each of the steps shown in FIG. 1 preferably involves the use of batteries that are based on single stage or countercurrent multistage solvent extraction vessels. A single stage can be carried out in a mixer-settler while the multistage battery can use several mixer-settlers, optionally combined with solvent extraction columns. Briefly, the organic and aqueous phases are fed countercurrent to one another. Thus the organic phase from the nth stage is fed to the "n+1" stage, while the aqueous phase from the nth stage is fed to the "n−1" stage. Details regarding suitable mixer-settlers can be found in EP 1414748.

In operation, the bromide-containing aqueous feed stream (8) is mixed with an aqueous stream (15) exiting the purification step (2). This combined feed is directed to the extraction step (1), where it is mixed in a countercurrent fashion with the extraction medium. An aqueous acidic stream (9), e.g., HCl, is periodically or continuously injected into the extraction step, to provide the acidic environment necessary for the maintaining the amine extractant in the form of its acid addition salt, e.g., $R_3NH^+A^-$. The acidic stream is preferably injected into the extraction step separately from the feed stream, although it is possible to combine the aqueous feed and aqueous acid streams together prior to their introduction into the extraction step.

The extraction step is carried out at pH preferably <3. The final stage of the extraction step produces a mixture consisting of two phases, an organic phase and aqueous phase. Following phase separation, the aqueous phase, namely, the depleted bromide-containing solution with reduced bromide content (e.g., less than 200 ppm, or even less than 50 ppm), can be discarded (14). The organic phase in the other end of the extraction battery consists of the extract which is now loaded with most of the bromide originally in the aqueous feed. Thus, the amine extractant present in the organic phase feed is a mixture consisting $R_3NH^+Cl^-$, $R_3NH^+Br^-$, $(R_3NH)_2SO_4^{2-}$ and $R_3NH^+NO_3^-$.

The chloride/bromide-loaded extraction medium withdrawn from the extraction step (1) is now fed to the purification step (2), where it allowed to mix with a portion or all of aqueous solution(s) of a bromide salt (16, 19), produced in the final washing/stripping step (3). The purpose of the purification step is mainly to displace chloride ions attached to the extractant ($R_3NH^+Cl^-$) with bromide ions, generating bromide-enriched extract.

The last stage of the purification step produces a mixture consisting of two phases, an organic phase and aqueous phase.

Following phase separation, the aqueous phase exiting the purification step (15) is combined with the bromide-containing aqueous feed (8) and the combined stream is fed to the extraction step (1), as previously described. The organic phase exiting the other end (6) of purification step (2) is the extraction medium comprising the extractant substantially in the form of $R_3NH^+Br^-$. The bromide-enriched extraction medium is fed to the washing step (3) consisting of three successive washing/stripping stages [($3^1$), ($3^2$) and ($3^3$), where it is mixed sequentially with a series of bases, e.g., in an aqueous form, namely, $M^1(OH)_p$, $M^2(OH)_p$ and $M^3(OH)_p$, fed via lines (11), (12) and (13), respectively. Alkaline aqueous solutions comprising alkali hydroxide (e.g., NaOH solution) are fed in the first and third stages of the battery ($M^1$=Na, $M^3$=Na) and an alkaline earth hydroxide, e.g., calcium hydroxide in the intermediate stage of the battery ($M^2$=Ca). Preferably, $Ca(OH)_2$ suspended in a concentrated solution of $CaBr_2$ or water can be used to yield the product $CaBr_2$, which is discharged (10).

In general, the purpose of the washing/stripping step is to regenerate the extractant and recover the bromide salt product. In the event that NaOH is used solely, then the following reaction takes place, to afford aqueous solution of sodium bromide as the product:

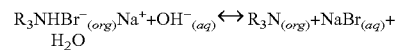

The washing step is carried out at a pH in the range from 6 to (e.g. 7 to 9). The last stage ($3^3$) of the washing step produces a mixture comprising an organic phase and an aqueous phase. The organic phase consists of the extraction medium in which the amine extractant is now in the free base form. The regenerated extraction medium is recycled (4) and returned to the extraction step.

The washing step, which is divided into three successive stages, is now described in more detail.

The first washing stage ($3^1$) is accomplished with the aid of a concentrated NaOH solution (11), whereby the extract is partially neutralized to form a heavy aqueous phase which is transferred (16) to the purification battery (with pH 4-6). In this wash essentially all the sulfate unions captured by the extract are removed and transferred to the purification battery (2) and from there to the extraction battery (1) and to the depleted solution (14). The extract stream (17) exiting the washing stage ($3^1$) is therefore an essentially sulfate-free, bromine loaded extract.

The second washing stage ($3^2$) is accomplished with the aid of a $Ca(OH)_2$ suspension in $CaBr_2$ solution (12). In this stage the salt product is formed, which partially exits the system as the product (10). The calcium bromide product is partially circulated (not shown) for the preparation of fresh calcium suspension required for the washing stage. In the extract stream (18) which exits the second washing stage ($3^2$), the tertiary amine is still loaded with some bromide.

The third washing stage ($3^3$) is accomplished with the aid of a dilute NaOH solution (13) to achieve a complete neutralization of the extract, following which the extract is circulated via flow path (4) to the start of the process. The heavy aqueous phase (19) exiting the third washing stage ($3^3$) is combined with the heavy phase (16) exiting the first washing stage ($3^1$) and transferred to the purification step (2).

The yield, calculated as $Br^-$, viz. the ratio between the amounts of bromide in the product solution to the amount in the feed brine, may be between 95% and 99.9%. It can be increased by increasing the number of stages in the various batteries and increasing the ratio of the organic phase to the feed. It should be understood that the countercurrent flow scheme described in detail above is optional, and alternative flow schemes (e.g., crosscurrent flow, as described in EP 1414748) may be employed.

In general, the bromide-containing aqueous waste streams which may be subjected to the extraction process according to the invention may contain, in addition to bromide and sulfate, also chloride and/or nitrate. A feed stream may have a specific density of less than 1.3 g/cm$^3$ or less than 1.2 g/cm$^2$. The bromide:chloride ratio is in the range from 1:25 to 25:1, e.g. from 1:10 to 10:1; the waste stream may contain sulfate ions and alkaline or alkaline earth cations. Such waste streams include—but are not limited to—WFGD solutions, namely, the solutions produced in electric power generating plants employing the WFGD process, in which the flue gas flows through a suitable gas-liquid contactor and contacts therein with calcium-containing slurry (e.g., limestone). Sulfur dioxide present in the flue gas is absorbed in the slurry and is transformed into sulfur trioxide which in turn reacts with the calcium compound in a suitable reaction vessel. The following is an exemplary composition of the waste aqueous solution generated by a typical WFGD process: 0.1-1 wt % $Ca^{2+}$, 0.05-1.4 wt % $Mg^{2+}$, 0.1-1.5 wt % $Na^+$, 0.05-3 wt % $Br^-$, 0.2-3 wt % $Cl^-$, 0.1-0.4 wt % $SO_4^{2-}$ and 0.005-0.2 wt % $NO_3^-$, with specific gravity of about 1.04 g/cm$^3$.

In the event that the optional purification step is not carried out, then the product obtained by the process typically has a $Br^-/Cl^-$ weight ratio from about 1:1 to about 3:1 and $Br^-/SO_4^{2-}$ from about 1:1 to 15:1. In the event that the purification step forms part of the process, then the product obtained has a $Br^-/Cl^-$ weight ratio from 5:1 to 80:1. The $Br^-/SO_4^{2-}$ is very high; furthermore, the successive washings stages described above result in essentially complete elimination of the sulfate, such that calcium bromide can be produced without the obstruction of the sulfate. When nitrate is present in the sulfate-containing aqueous stream, then said nitrate is extracted along with the bromide.

EXAMPLES

Materials

The WFGD brine used in the following examples consists of:

|   | % | eq/Kg |
|---|---|---|
| Br– | 1.40 | 0.17 |
| Cl– | 1.25 | 0.35 |
| $SO_4^{2-}$ | 0.27 | 0.06 |
| NO3– | 0.12 | 0.02 |
| Anions (eq/Kg) |  | 0.60 |
| TOC | 33 ppm |  |

32% hydrochloric acid was purchased from Bio-Lab Ltd Company, Germeny. 1-Decanol and Sodium Hydroxide pellets were purchased from Merck KGaA Company, Germany. Parasol (boiling range 200-260° C., composed of aliphatic hydrocarbon) was purchased from Paz & Oils Chemicals Ltd Company, Israel. Alamine 336 was purchased from Cognis Corporation Company, Germany. Ketrul D80 (petroleum) was purchased from Total Fluids Company, France. TBP (Tributylphosphate) was purchased from Sigma-Aldrich, Israel. TIBP (Tri-iso-butylphosphate), HALLOCO-MID-M-10(N,N-dimethyldecanamide) and HALLOCO-MIDE-M-8-10 (N,N-dimethyloctylamide and N,N-dimethyldecanamide) were purchased from Stepan Company, USA. All materials were used without further purification. The percentages here and throughout the document are by weight unless otherwise indicated.

Methods

The analytical methods used are summarized in the following table:

| Species | Methods | Instrument |
|---|---|---|
| Cl$^-$ Br$^-$ Aqueous phase | Potentiometric titration: precipitation titration | 848 Titrino plus, METROHM |
| Br$^-$ Aqueous phase | Iodometric titration |  |
| Cl$^-$ Aqueous phase | Potentiometric titration: precipitation titration | 848 Titrino plus, METROHM |
| Cl$^-$ Br$^-$ Organic phase | Argentometric potentiometric titration | Titrator |
| Br$^-$ Organic phase | Argentometric potentiometric titration | Titrator |
| Cl$^-$ Organic phase | Argentometric potentiometric titration | Titrator |
| $SO_4^{2-}$ Aqueous phase | ICP | ICP-AES Vista AX, Varian |
| $CO_3^-$ Aqueous phase | Aqueous pH titration | 848 Titrino plus, METROHM |
| $NO_3^-$ Aqueous phase | Ion Chromatograph | Dionex DX 500 IC EP40 pump ED40 detector AS9-HC column AG9-HC guard column |
| $Ca^{2+}$ Aqueous phase | AAS | AA240FS, Varian |
| $Na^+$ Aqueous phase | AAS | AA240FS, Varian |
| Total Organic Carbon Aqueous phase | TOC | Multi N/C 2100S Analytic jena |
| $H_2O$ Organic phase | Karl Fisher | Karl Fischer titrator |
| Alamine 336 | Acid base titration H NMR LC-MS | AVANCE III 500 MHz Bruker NMR Spectrometer Bruker Esquire LC Agilent HPLC 1200 |
| Parasol | H NMR GC-MS | AVANCE III 500 MHz Bruker NMR Spectrometer Agilent GC 7890 MS 5975C |
| Decanol | H NMR GC-MS | AVANCE III 500 MHz Bruker NMR Spectrometer Agilent GC 7890 MS 5975C |

Examples 1 to 8

The seperability of various Alamine 336-containing organic/aqueous mixtures into an aqueous phase and a single organic phase was investigated. In Example 1, Alamine 336 was used alone. In Examples 2 to 7, Alamine 336 (1.11 mol, 393 g) was mixed with 518 gram of the tested diluent. In Example 8, Alamine 336 (1.11 mol, 393 g), Parasol as a diluent (518 g) and Decanol (0.56 mol, 89.9 g) were mixed together to form the organic medium. The organic mixture was then combined with 1250 ml of 0.8M of HCl aqueous solution in a separatory funnel. The resultant mixture was allowed to separate into an aqueous phase and organic phase(s).

When good separation was achieved, i.e., the mixture separates into a single organic phase and an aqueous phase, the organic phase was analyzed for Cl$^-$ and water content and the corresponding aqueous phase was analyzed for Total Organic Carbon (TOC). The compositions tested and the results are tabulated in Table 1.

TABLE 1

| Ex. | Diluent | Cl— Loading after charging - Org. phase | | | Aq. phase TOC (ppm) | Separation |
|---|---|---|---|---|---|---|
| | | % Cl— | % Load | H₂O | | |
| 1 | Alamine 336 alone | | | | | 3 phases |
| 2 | Alamine 336 in Ketrul D80 | | | | | 3 phases |
| 3 | Alamine 336 in Parasol | | | | | 3 phases |
| 4 | Alamine 336 in TBP | 2.72 | 94.56 | 7.98 | | 2 phases |
| 5 | Alamine 336 in TIBP | 2.79 | 97 | 8.4 | 165-591 | 2 phases |
| 6 | Alamine 336 in HALLOCOMID M-10 | 2.79 | 98 | 14 | 230-580 | 2 phases |
| 7 | Alamine 336 in HALLOCOMID M-8-10 | 2.72 | 97.34 | 16 | 2170-2698 | 2 phases |
| 8 | Alamine 336 in Parasol + decanol | 3.3 | 93.3 | 2.19 | 39-172 | 2 phases |

The results summarized in Table 1 show that an organic diluent based on the combination of aliphatic hydrocarbon solvent (e.g., Parasol) and C6-C13 alcohols, such as 1-decanol, allows both good phases separation and minimization of the amount of water remaining in the organic phase.

Example 9

Alamine 336 (1.11 mol, 393 g), Decanol (0.56 mol, 89.9 g) and Parasol (518 g) were mixed together. The mixture was combined with 1250 ml of 0.8M of HCl aqueous solution in a separatory funnel. The resultant mixture, which consists of two phases, was separated into organic and aqueous phases. The organic phase was analyzed for Cl⁻, H₂O and Total Organic Carbon (TOC) and gave the following results: 3.3% Cl⁻, 2.2% H₂O, 130-200$_{ppm}$ TOC and 93% loading of the Alamine 336 extractant.

The charged organic phase was equilibrated with an excess of bromide-containing aqueous solution at $1_{aq}:20_{org}$ weight ratio. The composition of the bromide-containing aqueous solution is as set out above.

The resultant mixture was allowed to settle and was then separated into organic and aqueous phases, which were analyzed for Br⁻, Cl⁻ and TOC. The results are tabulated in Table 2.

TABLE 2

| Phase | pH | TOC (ppm) | % Cl⁻ | % Br⁻ |
|---|---|---|---|---|
| Organic | — | — | 3.23 | 0.056 |
| Aqueous | 2.9 | 80 | 2.23 | 0.006 |

Example 10

The procedure set out in Example 9 was repeated, but this time the bromide-containing aqueous solution was equilibrated with an excess of charged organic phase (loaded with 3.3% Cl⁻) at $1_{org}:30_{aq}$ weight ratio and the mixture was acidified to pH=3 by the addition of 0.1% HCl solution.

The resultant mixture was allowed to settle and was then separated into the organic and aqueous phases, which were analyzed for Br⁻, Cl⁻ and TOC. The results are tabulated in Table 3.

TABLE 3

| Phase | Loading (%) | TOC (ppm) | % Cl⁻ | % Br⁻ |
|---|---|---|---|---|
| Organic | 80 | — | 0.7 | 4.23 |
| Aqueous | — | 105 | 1.58 | 1.23 |

Example 11

The procedure set out in Example 9 was repeated, but this time the charged organic phase was equilibrated at $1_{org}:5.2_{aq}$ weight ratio in order to obtain 1:1 equivalent ratio of Br⁻ in the aqueous phase and Cl⁻ in the organic phase.

The mixture formed was allowed to settle and was then separated into the organic and aqueous phases, which were submitted for analysis.

The organic phase was analyzed for % Br⁻ and % Cl⁻ and the aqueous phase was analyzed for % Br⁻, % Cl⁻, % NO₃⁻, % SO₄²⁻ and TOC. The results are shown in Table 3 below. The organic phase (extract) was then taken and purified with 40% NaBr aqueous solution at $1_{aq}:1_{org}$ weight ratio. The resultant mixture was separated into two phases, organic and aqueous. The organic phase was analyzed for % Br⁻, % Cl⁻ and H₂O and the aqueous phase was analyzed for % Br⁻, % Cl⁻, % NO₃⁻, % SO₄²⁻ and TOC. The results are summarized in Table 4.

TABLE 4

| Aqueous phase | | | | | | Organic phase | | | | | | | |
|---|---|---|---|---|---|---|---|---|---|---|---|---|---|
| | TOC | | | | | | | % Loading | | | | | |
| pH | (ppm) | % SO₄ | % NO₃ | % Cl | % Br | H₂O | Tot. | Br | Cl | $S^{Br}_{Cl}$ | % Cl | % Br | |
| 4.4 | 85.1 | 0.215 | 0.06 | 1.83 | 0.81 | 1.215 | 71.22 | 43.62 | 27.60 | 8.02 | 0.91 | 3.23 | Extraction |
| 6.15 | 40.6 | 0.41 | 0.28 | 0.94 | 28.6 | 0.67 | 79.87 | 79.26 | 0.61 | 9.68 | 0.02 | 5.89 | Purification |

The purified organic phase was treated with 17.5% NaOH solution, arriving at pH around 9. The phases were separated, the organic solution was analyzed for % Br⁻, % Cl⁻, H₂O and the aqueous phase was analyzed for % NaBr, % Cl⁻ % NO₃⁻, % SO₄²⁻ and TOC. The results are summarized in Table 5.

TABLE 5

| Organic phase | | | Aqueous phase | | | | | | Eq. Ratio Br⁻:OH⁻ | |
| --- | --- | --- | --- | --- | --- | --- | --- | --- | --- | --- |
| % Cl | % Br | % H₂O | pH | TOC ppm | % SO₄ | % NaBr | % NO₃ | % Cl | % Br | aq | org |
| <0.002 | <0.002 | 0.11 | 9.3 | 335 | <0.01 | 32 | 0.15 | 0.09 | 24.6 | 1 | 1.25 |

Example 12

The set of experiments reported in this Example illustrates the effect of temperature variation on the extraction efficiency of bromide, chloride and sulphate by a tertiary amine extractant such as Alamine 336. The procedure set out below was carried out at temperatures of 10° C., 25° C. and 50° C.

Alamine 336 (0.22 mol, 80 g), Decanol (0.11 mol, 18.36 g) and Parasol (105.6 g) were mixed together. The mixture was equilibrated with a bromide-containing aqueous solution at $1_{aq}$:$2.5_{org}$ weight ratio. 20% HCl (39 g) was added dropwise until pH=2 was reached (the composition of the bromide-containing aqueous solution is as set out above). The resultant mixture was allowed to settle and was then separated into organic and aqueous phases. The organic phase was analyzed for % Br—, % Cl—, % H⁺ and % H₂O and the aqueous phase was analyzed for % Br—, % Cl—, % NO₃—, % SO₄— and TOC. The measured results are tabulated in Table 6 below.

TABLE 6

| | 10° C. | | 25° C. | | 50° C. | |
| --- | --- | --- | --- | --- | --- | --- |
| | Aqueous phase | Organic phase | Aqueous phase | Organic phase | Aqueous phase | Organic phase |
| % Br– | 0.35 | 2.76 | 0.43/0.42 | 2.76 | 0.47 | 2.59 |
| % Cl– | 1.99 | 1.86 | 1.99 | 1.91 | 1.99 | 1.97 |
| % SO4–– | 0.15 | 0.2198 | 0.15 | 0.2201 | 0.15 | 0.2184 |
| % NO3– | 0.0072 | 0.1761 | 0.0093 | 0.1737 | 0.0119 | 0.166 |
| TOC$_{ppm}$ | 108 | | 123 | | 128 | |
| % H+ | | 0.0907 | | 0.0908 | | 0.0909 |
| % H₂O | | 1.74 | | 1.56 | | 1.7 |
| H+ (eq/Kg) | | 0.9000 | | 0.9010 | | 0.9020 |
| Anions (eq/Kg) | | 0.9441 | | 0.958 | | 0.9521 |

The results set out in Table 6 were used to calculate some useful quantities which are tabulated in Table 7 below. The quantities of interest are:

The distribution coefficient $K_x$ (x=Br⁻, Cl⁻, NO₃⁻, SO₄²⁻): the ratio (at equilibrium) of the concentration of the anion X in the extract and aqueous phases. The distribution coefficient is a measure of the affinity of the anion towards the two phases.

The selectivity $S^{Br}_Y$ (y=Cl⁻, NO₃⁻, SO₄²⁻): the ratio of the distribution coefficient of bromide to the distribution coefficient of anion Y. Thus, $S^{Br}_Y$ is a measure of the selectivity for the extractant to bromide as against anion Y, i.e., the ability of Alamine 336 to selectively extract bromide from an aqueous solution in which a competitor Y is also present.

TABLE 7

| | 10° C. | 25° C. | 50° C. |
| --- | --- | --- | --- |
| Loading H+ | 91.34% | 89.75% | 88.27% |
| Loading Anions | 95.82% | 95.45% | 93.19% |
| NO3– loading | 2.88% | 2.79% | 2.62% |

TABLE 7-continued

| | 10° C. | 25° C. | 50° C. |
| --- | --- | --- | --- |
| SO4–– loading | 4.62% | 4.56% | 4.45% |
| Br– loading | 35.06% | 34.41% | 31.73% |
| Cl– loading | 53.26% | 53.68% | 54.39% |
| $K_{Br}$ | 7.89 | 6.42 | 5.51 |
| $K_{Cl}$ | 0.93 | 0.97 | 0.99 |
| $K_{NO3}$ | 24.46 | 18.68 | 13.95 |
| $K_{SO4}$ | 1.47 | 1.47 | 1.46 |
| $S^{Br}_{SO4}$ | 5.38 | 4.38 | 3.78 |
| $S^{Br}_{No3}$ | 0.32 | 0.34 | 0.39 |
| $S^{Br}_{Cl}$ | 8.44 | 6.62 | 5.57 |
| H₂O | 1.74 | 1.56 | 1.70 |

The results set out in Table 7 show that Alamine 336 has higher selectivity for bromide against sulfate over a broad temperature range. Furthermore, the distribution coefficients of sulfate and chloride are not affected by temperature variation, whereas the extraction efficiency of bromide is increased with decreasing temperature.

Example 13

The set of experiments reported in this Example illustrates the effect of washing in stages the organic phase collected following an extraction step, with a strong base being used in the first stage to partially neutralize the extractant, i.e., arriving at pH in the range from 4 to 6. The procedure set out below was carried out at different temperatures of 10° C., 25° C. and 50° C.

The organic phase (extract) obtained in Example 12 was taken and partially washed with concentrated NaOH aqueous solution until pH=5 was reached. The resultant mixture was separated into two phases, organic and aqueous. The organic phase was analyzed for % Br—, % Cl—, % NO₃—, % SO₄—, % H⁺ and % H₂O. The aqueous phase was analyzed for % Br—, % Cl—, % NO₃—, % SO₄— and TOC. The results are summarized in Table 8.

TABLE 8

| | 10° C. | | 25° C. | | 50° C. | |
|---|---|---|---|---|---|---|
| | Aqueous phase | Organic phase | Aqueous phase | Organic phase | Aqueous phase | Organic phase |
| % Br– | 5.12 | 1.9 | 4.95 | 1.83 | 5.06 | 1.69 |
| % Cl– | 7.34 | 0.33 | 7.59 | 0.39 | 7.64 | 0.33 |
| % SO4–– | 1.15 | 0.0072 | 1.06 | 0.0254 | 1.09 | 0.0116 |
| % NO3– | 0.34 | 0.1192 | 0.34 | 0.1163 | 0.34 | 0.1059 |
| % H+ | | 0.0349 | | 0.0331 | | 0.0351 |
| % $H_2O$ | | 0.48 | | 0.475 | | 0.52 |
| $TOC_{ppm}$ | 55 | | 40.4 | | 43 | |
| H+ (eq/Kg) | | 0.3462 | | 0.3284 | | 0.3482 |
| Anions (eq/Kg) | | 0.353 | | 0.3631 | | 0.3664 |

The results set out in Table 8 demonstrate that the incomplete neutralization of the extractant allows an effective removal of the sulfate from the organic phase, which still remains bromide-loaded. The so-formed sulfate-free, bromide-loaded organic phase may proceed to the next washing stage, to be combined with an aqueous solution of calcium ion.

The next set of examples (Examples 14 and 15) illustrates the results of experiments which were conducted in a bench scale continuous pilot plant in which batteries of mixer-settlers were arranged in succession according to the stages set forth in FIG. 1. In both examples, the bromide-containing solution had approximately the following composition: 1% Br⁻, 1.5% Cl⁻, 0.1% $NO_3^-$ and 0.4% $SO_4^{2-}$. The extraction medium employed was a mixture consisting of parasol, Alamine 336 (at a concentration of 0.8 M, about 39 wt %) and Decanol (at a concentration of 0.45 M, about 9 wt %).

Example 14

The various streams were fed at the following flow rates [kg/hr]: bromide-containing aqueous stream: 2.0; extraction medium: 0.8; HCl 20%: 0.1; NaOH 23%: 0.13.
Production rate: 0.082 kg/hr of 3% Cl⁻, 2% $NO_3^-$ (in the 30% NaBr solution).
Yield of Br⁻ extraction: 98-99%.
Representative Concentrations:
Depleted brine: Br⁻ 200 ppm; Cl⁻ 2.5-3.5%; $NO_3^-$ 10-100 ppm, pH=1-3
Extract: Br⁻ 2.3-2.5%; Cl⁻ 1.9-2.1%.
Washed solvent: Br⁻-50-200 ppm.

Example 15

The various streams were fed at the following flow rates [kg/hr]: bromide-containing aqueous stream: 2.0; extraction medium: 0.8; HCl 20%: 0.1; NaOH 23%: 0.07, $Ca(OH)_2$ (3% solids in 50% $CaBr_2$) 0.4.
Production rate: 0.04 kg/hr of 1.2-1.8% Cl⁻, 1.5-2% $NO_3^-$ (in 50% $CaBr_2$ solution).
Yield of Br— extraction: 98-99%.
Representative Concentrations:
Depleted brine: Br⁻ 200 ppm, Cl⁻ 2.5-3.5%, $NO_3^-$ 10-100 ppm, pH=1-3
Extract: Br⁻ 3.0-3.5%, Cl⁻ 1.5-1.8%
Washed solvent Br⁻ 100-300 ppm

The invention claimed is:

1. A solvent extraction process for recovering bromide from a sulfate-containing aqueous stream, the process comprises an extraction step wherein said aqueous stream is mixed with an extraction medium comprising a tertiary amine extractant dissolved in one or more water-immiscible organic solvents, wherein said mixing is carried out in a strongly acidic environment, thereby forming bromide-containing extract and a raffinate with a reduced bromide level, wherein the extraction medium is devoid of extractants other than said tertiary amine, wherein the bromide-containing extract is optionally treated to further minimize the presence of sulfate and is subsequently combined with an aqueous calcium source to form calcium bromide.

2. A process according to claim 1, wherein the amine extractant is a mixture comprising trioctyl amine [$N(C_8H_{18})_3$] and tridecyl amine [$N(C_{10}H_{22})_3$].

3. A process according to claim 1, wherein the tertiary amine extractant is dissolved in a mixture of one or more aliphatic hydrocarbon(s) and an alcohol containing not less than 6 carbon atoms.

4. A process according to claim 3, wherein the tertiary amine extractant is dissolved in petroleum distillate consisting of a mixture of different chains with molecular weight from about 130 to 250 g/mol.

5. A process according to claim 3, wherein the alcohol comprises decanol.

6. A solvent extraction process for recovering bromide from a sulfate-containing aqueous stream, comprising:
an extraction step, wherein said aqueous stream is mixed with an extraction medium comprising a tertiary amine extractant dissolved in one or more water-immiscible organic solvents, wherein the extraction medium is devoid of extractants other than said tertiary amine, wherein said mixing is carried out in a strongly acidic environment, thereby forming a bromide-containing extract and a raffinate with reduced bromide levels;
a purification step, wherein the bromide-containing extract is treated with an aqueous bromide solution to form a bromide- enriched extract; and
a washing step, wherein the bromide-enriched extract undergoes gradual neutralization and sulfate removal by combining same with a plurality of aqueous bases applied in succession, with phase separation taking place between each stage of basification to produce, after each stage, an aqueous bromide salt solution corresponding to the base employed and an organic medium with progressively increasing content of the tertiary amine in its free base form, wherein at least one of said successively applied aqueous bases—with the exception of the first—comprises a calcium source.

7. A process according to claim 6, wherein at least one aqueous bromide salt solution generated in the washing step is directed to, and used in, the purification step, as a bromide source for converting the bromide-containing extract into a bromide-enriched extract.

8. A process according to claim 7, wherein the washing step comprises:
mixing the bromide-enriched extract with a base $M^1(OH)_p$ to form a first mixture;
separating said first mixture into a first organic phase, comprising an essentially sulfate-free bromide-containing extract and a first aqueous phase, comprising a solution of a bromide salt $M^1(Br)_p$,
mixing said essentially sulfate-free, bromide-containing extract with a calcium source, to form a second mixture;
separating said second mixture into a second organic phase, consisting of a bromide-containing extract, and a second aqueous phase, comprising an aqueous solution of calcium bromide; mixing said bromide-containing extract with a base $M^3(OH)_p$, to form a third mixture;
separating said third mixture into a third organic phase, consisting of a bromide-free extraction medium in which the tertiary amine is present in its free base form, and a third aqueous phase, comprising an aqueous solution of a bromide salt $M^3(Br)_p$,
wherein the process further comprises directing the so-formed bromide solutions $M^1(Br)_p$ and $M^3(Br)_p$ to the purification step, and the bromide-free extraction medium to the extraction step.

9. A process according to claim 8, wherein $M^1$ and $M^3$ independently indicate an alkali metal and p is 1.

10. A process according to claim 1, wherein the extraction takes place at a temperature below 25° C.

11. A process according to claim 1, wherein nitrate present in the sulfate-containing aqueous stream is extracted along with the bromide.

12. A process according to claim 6, wherein the amine extractant is a mixture comprising trioctyl amine [$N(C_8H_{18})_3$] and tridecyl amine [$(N(C_{10}H_{22})_3$].

13. A process according to claim 6, wherein the tertiary amine extractant is dissolved in a mixture of one or more aliphatic hydrocarbon(s) and an alcohol containing not less than 6 carbon atoms.

14. A process according to claim 13, wherein the alcohol comprises decanol.

15. A process according to claim 6, wherein the tertiary amine extractant is dissolved in petroleum distillate consisting of a mixture of different chains with molecular weight from about 130 to 250 g/mol.

* * * * *